US 8,428,311 B2

(12) United States Patent
Dariush et al.

(10) Patent No.: US 8,428,311 B2
(45) Date of Patent: Apr. 23, 2013

(54) CAPTURING AND RECOGNIZING HAND POSTURES USING INNER DISTANCE SHAPE CONTEXTS

(75) Inventors: Behzad Dariush, Sunnyvale, CA (US); Raghuraman Gopalan, College Park, MD (US)

(73) Assignee: Honda Motor Co., Ltd., Tokyo (JP)

( * ) Notice: Subject to any disclaimer, the term of this patent is extended or adjusted under 35 U.S.C. 154(b) by 596 days.

(21) Appl. No.: 12/709,287

(22) Filed: Feb. 19, 2010

(65) Prior Publication Data

US 2010/0215257 A1    Aug. 26, 2010

Related U.S. Application Data

(60) Provisional application No. 61/155,439, filed on Feb. 25, 2009.

(51) Int. Cl.
*G06K 9/00* (2006.01)
(52) U.S. Cl.
USPC .......................... 382/115; 382/225; 715/863
(58) Field of Classification Search .................. 382/224, 382/115, 225
See application file for complete search history.

(56) References Cited

U.S. PATENT DOCUMENTS

| | | | |
|---|---|---|---|
| 5,815,397 A * | 9/1998 | Saito et al. ..................... 700/204 |
| 6,363,160 B1 * | 3/2002 | Bradski et al. ................. 382/103 |
| 6,674,877 B1 | 1/2004 | Jojic et al. | |
| 6,853,964 B1 | 2/2005 | Rockwood et al. | |
| 7,457,733 B2 | 11/2008 | Maille et al. | |
| 8,090,155 B2 * | 1/2012 | Lacey et al. .................... 382/107 |
| 8,170,287 B2 | 5/2012 | Dariush et al. | |
| 2003/0113018 A1 | 6/2003 | Nefian et al. | |
| 2004/0193413 A1 | 9/2004 | Wilson et al. | |
| 2005/0271279 A1 | 12/2005 | Fujimura et al. | |
| 2006/0182346 A1 | 8/2006 | Yoda et al. | |
| 2006/0269145 A1 | 11/2006 | Roberts | |
| 2007/0110306 A1 | 5/2007 | Ling et al. | |
| 2007/0140562 A1 | 6/2007 | Linderman | |
| 2008/0019589 A1 | 1/2008 | Yoon et al. | |
| 2008/0085048 A1 | 4/2008 | Venetsky et al. | |
| 2008/0181459 A1 | 7/2008 | Martin et al. | |
| 2008/0247649 A1 * | 10/2008 | Cheng ........................... 382/190 |

(Continued)

OTHER PUBLICATIONS

Holte, Fusion of Range and Intensity Information for View Invariant Gesture Recognition, Jun. 23-28, 2008, IEEE Computer Society Conference on Computer Vision and Pattern Recognition Workshops, 7 pages total.*

(Continued)

*Primary Examiner* — Matthew Bella
*Assistant Examiner* — Dennis Rosario
(74) *Attorney, Agent, or Firm* — Fenwick & West LLP; Mark E. Duell

(57) ABSTRACT

A system, method, and computer program product for recognizing hand postures are described. According to one aspect, a set of training images is provided with labels identifying hand states captured in the training images. Inner Distance Shape Context (IDSC) descriptors are determined for the hand regions in the training images, and fed into a Support Vector Machine (SVM) classifier to train it to classify hand shapes into posture classes. An IDSC descriptor is determined for a hand region in a testing image, and classified by the SVM classifier into one of the posture classes the SVM classifier was trained for. The hand posture captured in the testing image is recognized based on the classification.

19 Claims, 10 Drawing Sheets

U.S. PATENT DOCUMENTS

2008/0317331 A1    12/2008   Winn et al.
2009/0175540 A1     7/2009   Dariush et al.
2009/0252423 A1    10/2009   Zhu et al.

OTHER PUBLICATIONS

Niebles et al., A Hierarchical Model of Shape and Appearance for Human Action Classification, Jun. 17-22, 2007, IEEE Conference on Computer Vision and Pattern Recognition, 2007, 8 pages total.*

Wagner et al., Framework for a Portable Interface, Apr. 2-6, 2006, Proceedings of the 7th International Conference on Automatic Face and Gesture Recognition, pp. 275-280.*

Zhang et al., Learning a discriminative classifier using shape context distances, Jun. 18-20, 2003, Proceedings of the 2003 IEEE Computer Society Conference on Computer Vision and Pattern Recognition, vol. 1, 6 total pages.*

Malassiotis et al., Real-time hand posture recognition using range data [on-line], Jul. 2, 2008 [retrieved on Jan. 11, 2013], Image and Vision Computing, vol. 26, Issue 4, pp. 1027-1037. Retrieved from the Internet: http://www.sciencedirect.com/science/article/pii/S0262885607002090.*

Yang et al., Two-Dimensional PCA: A New Approach to Appearance-Based Face Representation and Recognition [on-line], Jan. 2004 [retrieved on Jan. 11, 2013], IEEE Transactions on Pattern Analysis and Machine Intelligence, vol. 26, Issue:1, pp. 131-137. Retrieved from the Internet: http://ieeexplore.ieee.org/xpls/abs_all.jsp?arnumber=1261097.*

United States Patent and Trademark Office, Final Rejection, U.S. Appl. No. 12/317,369, Aug. 31, 2012, 21 pages.

United States Patent and Trademark Office, Non-final Rejection, U.S. Appl. No. 12/455,257, Jun. 26, 2012, 20 pages.

Andrews, R., "Tracking Multiple Objects in Real Time," Submitted for the degree of Bachelor of Engineering Honours, University of Queensland, Oct. 1999, 83 pages, Brisbane, Australia.

Chen, L., "Efficient Partial Shape Matching Using Smith-Waterman Algorithm," CVPR Workshop on Non-Rigid Shape Analysis and Deformable Image Alignment (NORDIA'08), Jun. 27-28, 2008, 6 pages, Anchorage, Alaska.

Jorstad, A., "Leaf Classification from Local Boundary Analysis," AMSC 664, Spring 2008, 28 pages, University of Marlyland, USA.

Ling, H., "An Efficient Earth Mover's Distance Algorithm for Robust Histogram Comparison," Center for Automation Research, Computer Science Department, University of Maryland, 35 pages, College Park, Maryland, USA.

Ling, H. et al., "Shape Classification Using the Inner-Distance," IEEE Transactions on Pattern Analysis and Machine Intelligence, 2007, vol. 29, No. 2, 35 pages.

PCT International Search Report and Written Opinion, PCT Application No. PCT/US2010/024697, Apr. 20, 2010, 7 pages.

PCT International Search Report and Written Opinion, PCT Application No. PCT/US2010/024689, Apr. 21, 2010, 6 pages.

Turk, M. et al., "Face Recognition Using Eigenfaces," Proceedings of the IEEE Conference on Computer Vision and Pattern Recognition (CVPR 91), 1991, pp. 586-591.

Zhu, G. et al.,"Learning Visual Shape Lexicon for Document Image Content Recognition," European Conference on Computer Vision, 2008, Part II, LNCS 5305, pp. 745-758, Marseille, France.

Zhu, Y. et al., "Controlled Human Pose Estimation from Depth Image Streams," Proceedings of IEEE Computer Society Conference on Computer Vision and Pattern Recognition Workshops, 2008, 8 pages, Anchorage, Alaska.

United States Patent and Trademark Office, Non-Final Rejection, U.S. Appl. No. 12/709,221, Sep. 26, 2012, 26 pages.

United States Patent and Trademark Office, Final Rejection, U.S. Appl. No. 12/455,257, Dec. 4, 2012, 24 pages.

* cited by examiner

CAPTURING AND RECOGNIZING HAND POSTURES USING INNER DISTANCE SHAPE CONTEXTS

RELATED APPLICATIONS

This application claims the benefit of U.S. Provisional Application No. 61/155,439, filed Feb. 25, 2009, the content of which is incorporated by reference herein in its entirety.

This application is related to U.S. patent application Ser. No. 12/455,257, filed May 29, 2009, titled "Controlled Human Pose Estimation From Depth Image Streams", U.S. patent application Ser. No. 12/317,369, filed Dec. 19, 2008, entitled "Controlled Human Pose Estimation From Depth Image Streams", and U.S. patent application Ser. No. 12/709,221, filed concurrently with this application, titled "Body Feature Detection and Human Pose Estimation Using Inner Distance Shape Contexts", all of which are incorporated by reference herein in their entirety.

BACKGROUND

1. Field of Disclosure

The disclosure generally relates to the field of tracking motion of a system, and more specifically, to hand shape classification from visual input.

2. Description of the Related Art

There has been a growing interest in capturing and recognizing hand shapes because of its broad application. The recognized hand shape can be used to transfer hand motion to robot systems (e.g., teleoperation, telemanipulation), to implement pervasive user interface, and to detect specific hand movements.

One conventional approach to capture hand movements instruments the human demonstrator with a data glove. While the human demonstrator performs certain tasks, sensors attached to the data glove measure the articulation angles or the Cartesian positions of selected feature points on the glove. See S. Ekvall and D. Kragic, "Grasp recognition for programming by demonstration", *Int. Conf Robotics and Automation (ICRA)*, 748-753 (2005), the content of which is incorporated by reference herein in its entirety. Although measurement of the glove configuration captures the underlying hand movement, the glove often obstructs the demonstrators contact with the object and may prevent natural hand movements. Moreover, calibration and adjustments for proper fit for different size hands is required to ensure accurate measurements.

Another conventional approach, in lieu of using a data glove, places markers on the hands of the human demonstrator and records hand articulations by tracking the positions of the markers. See N. Pollard and V. B. Zordan, "Physically based grasping control from examples", *AMC SIGGRAPH/ Eurographics Symp. On Computer Animation*, 311-318 (2005); see also L. Chang, N. Pollard, T. Mitchell, and E. Xing, "Feature selection for grasp recognition from optical markers", *Intelligent Robots and Systems (IROS)*, 2944-2950 (2007), both of which are incorporated by reference herein in their entirety. To minimize the effects of marker occlusions, multiple video cameras are used to track the markers. This approach is time consuming and requires considerable calibration in an instrumented and controlled environment.

Various approaches have also been developed for hand posture recognition. See Y. Wu and T. S. Huang, "Vision-Based Gesture Recognition: A Review", *Lecture Notes in Computer Science*, 1739-103 (1999), the content of which is incorporated by reference herein in its entirety. For example, there are approaches that deal with view-invariance (See Y. Wu and T. S. Huang, "View-Independent Recognition of Hand Postures", (2000), the content of which is incorporated by reference herein in its entirety), recognition under complex backgrounds (See J. Triesch and C. von der Malsburg, "A System for Person-Independent Hand Posture Recognition against Complex Backgrounds", *IEEE TRANSACTIONS ON PATTERN ANALYSIS AND MACHINE INTELLIGENCE*, 1449-1453 (2001), the content of which is incorporated by reference herein in its entirety), and adaptive learning using SIFT features (See C. Wang and K. Wang, "Hand Posture Recognition Using Adaboost with SIFT for Human Robot Interaction", *LECTURE NOTES IN CONTROL AND INFORMATION SCIENCES*, 370-317 (2008), the content of which is incorporated by reference herein in its entirety). However, these approaches are insufficient because their outcomes are largely subjective to viewing conditions such as lighting, blur variation, and view changes.

Hence, there is lacking, inter alia, a system and method for efficiently and accurately capturing and recognizing hand postures in real time.

SUMMARY

Embodiments of the present invention provide a method (and corresponding system and computer program product) for capturing and recognizing hand postures. According to one aspect, a single time-of-flight camera is utilized to capture hand movements of a human actor in a series of depth images. Hand regions are identified and segmented from the depth images. Inner Distance Shape Context (IDSC) descriptors are determined for the segmented hand regions and are classified to recognize the captured hand postures.

According to another aspect, the method trains a classifier to classify the IDSC descriptors by feeding the classifier with IDSC descriptors of training images along with labels identifying the corresponding hand postures. Once the classifier is trained, it can recognize a hand posture by classifying the corresponding IDSC descriptor into one of the posture classes the classifier was trained for.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The present invention provides a system (and corresponding method and computer program product) for recognizing hand postures in real time. The system identifies and segments a hand region in visual input, captures a posture of the segmented hand region by calculating an Inner Distance Shape Context (IDSC) descriptor, and recognizes the hand posture by classifying the IDSC descriptor.

For the sake of illustration, without loss of generality, this description assumes that the captured and recognized posture is of a human hand. Those of skill in the art will recognize that the techniques described herein can be utilized to capture and recognize postures of other body segments of human beings or other motion generators such as animals, for example.

The Figures (FIGS.) and the following description relate to embodiments of the present invention by way of illustration only. Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

OVERVIEW

Figure 1:
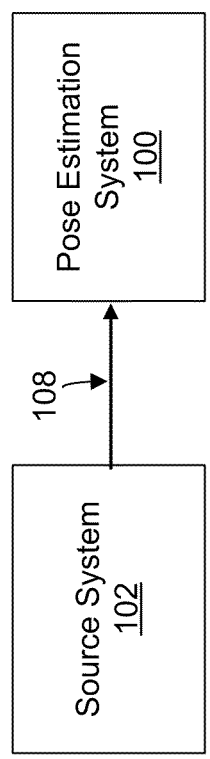
FIG. 1 is a block diagram illustrating a pose estimation system for recognizing hand postures in accordance with one embodiment of the invention.

FIG. 1 is a block diagram illustrating a pose estimation system 100 for recognizing hand postures (also called hand shapes, hand patterns, hand states) of a human actor in a source system 102. In one embodiment, in addition to recognizing the hand postures, the pose estimation system 100 also estimates overall poses and/or postures of other body segments of the human actor. The source system 102 generates a series of visual images of the human actor and transmits them to the pose estimation system 100 in an image stream 108. In one embodiment, the source system 102 utilizes a camera such as a time-of-flight camera (also called a TOF camera, a time-of-flight range image sensor) to continuously capture poses of the human actor and transmits a depth image stream 108 to the pose estimation system 100. The pose estimation system 100 detects a hand region (or two hand regions) and other body features in the received image stream 108, recognizes a hand posture in the hand region, and reconstructs the hand posture and the body pose of the human actor in a human model.

In addition to or instead of recognizing hand postures and estimating human poses, the pose estimation system 100 may be used for other purposes such as motion retargeting, tracking and estimation, and joint torque estimation in biomechanics. In motion retargeting, the pose estimation system 100 generates motion descriptors of the source system 102 based on the recognized hand postures and the reconstructed poses, and transmits the motion descriptors to a motion retargeting system, which generates joint variables for controlling the motion of a target system to simulate the motion in the source system 102. Further information of motion retargeting is found in U.S. application Ser. No. 11/734,758, filed Apr. 12, 2007, titled "Control Of Robots From Human Motion Descriptors", the content of which is incorporated by reference herein in its entirety.

Overview of Architecture for Pose Estimation System

Figure 2:
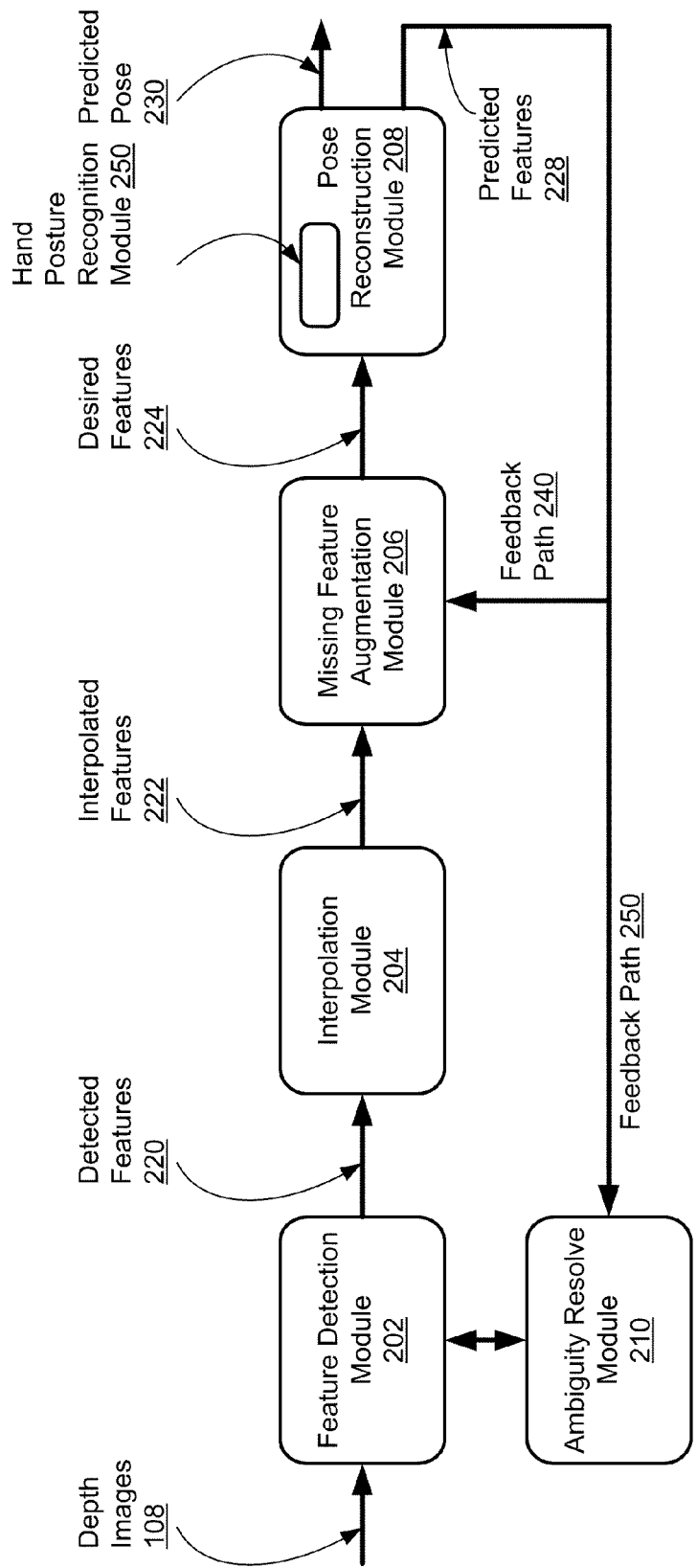
FIG. 2 is a block diagram illustrating a configuration of the pose estimation system shown in FIG. 1 in accordance with one embodiment of the invention.
Figure 6:
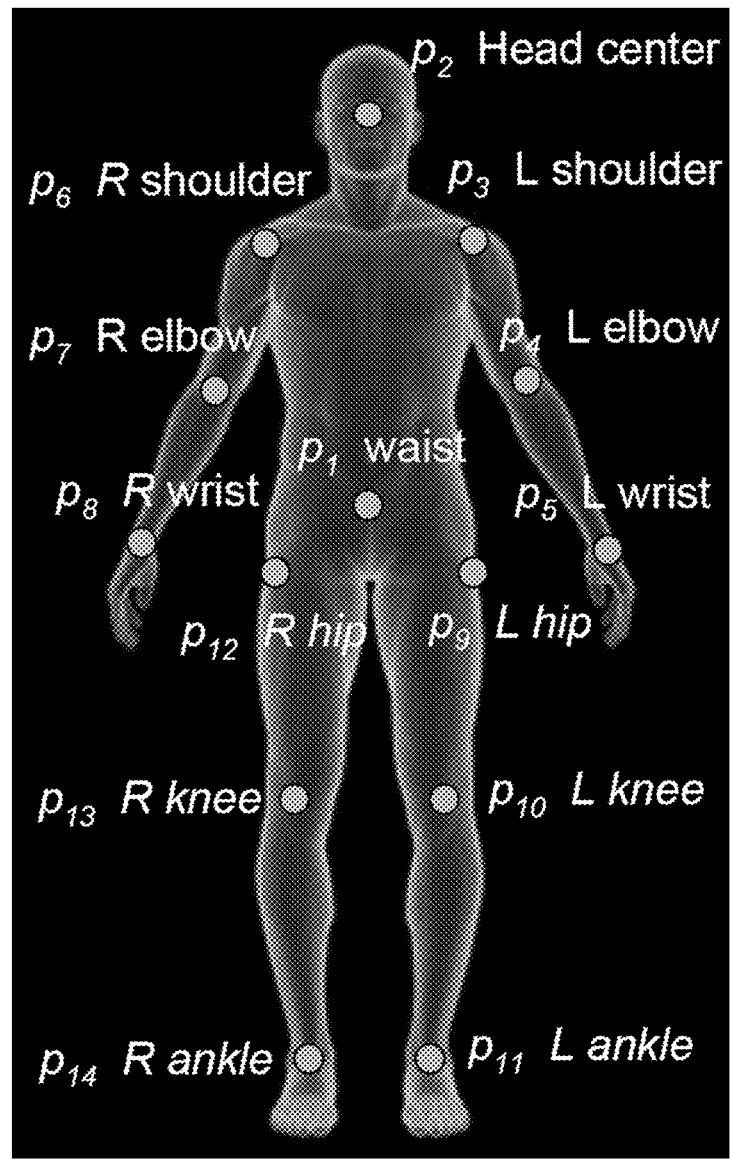
FIG. 6 is a diagram illustrating a human model in accordance with one embodiment of the invention.

FIG. 2 is a block diagram illustrating a configuration of the pose estimation system 100 for recognizing hand postures and estimating body poses according to one embodiment. The pose estimation system 100 identifies hand regions based on features detected in the depth image stream 108, and reconstructs body poses of a human actor from these detected features. The features (or feature points, anatomical features, key points) correspond to 3D positions of prominent anatomical landmarks on the human body. Without loss of generality, the pose estimation system 100 tracks fourteen (k=14) such body features as illustrated in FIG. 6. As shown, the fourteen features are head center, left shoulder, right shoulder, left elbow, right elbow, left wrist, right wrist, waist, left hip, right hip, left knee, right knee, left ankle, and right ankle. The reconstructed (or estimated) human pose q is described in the human model that tracks the human actor's pose. In one embodiment, the human model is a human anatomical model that closely resembles the body of the human actor.

As shown in FIG. 2, the pose estimation system 100 comprises a feature detection module 202, an interpolation module 204, a missing feature augmentation module 206, a pose reconstruction module (also called a constrained closed loop inverse kinematics module) 208, and an ambiguity resolve module 210.

The feature detection module 202 is configured to receive the depth image stream 108, detect features in the depth image stream 108, and output the detection results. Due to occlusions, unreliable observations, or low confidence in the detection results, the actual number of detected features for a particular image frame, denoted by m (m=0 . . . k), may be fewer than k. The detected features are represented by a position vector $p_{det}$ 220, which is formed by concatenating the 3D position vectors corresponding to the individual detected features.

The interpolation module 204 is configured to low pass filter the vector $p_{det}$ 220 received from the feature detection module 202 and generate interpolated features $\bar{p}_{det}$ 222. In one embodiment, the depth images transmitted to the pose estimation system 100 is captured at approximately 15 frames per second using a TOF camera (e.g., a Swiss Ranger SR-3000 3D time of flight camera). For stability in numerical integrations performed in the pose reconstruction module 208, the interpolation module 204 re-samples the detected features to a higher rate (e.g., 100 HZ) and represented by the vector $\bar{p}_{det}$ 222.

The missing feature augmentation module 206 is configured to augment $\bar{p}_{det}$ with positions of features missing in the depth image stream 108 and generate desired (or augmented) feature vector, denoted by $p_d$ 224. As noted above, the number of detected features at each frame may be fewer than fourteen (i.e. m<k=14) due to occlusions or unreliable observations. The missing feature augmentation module 206 receives the predicted features p 228 from the pose reconstruction module 208 through a feedback path 240 and utilizes p 228 to augment the missing features. The augmented features $p_d$ 224 represents the k=14 desired features used as input to the pose reconstruction module 208.

The pose reconstruction module 208 is configured to generate estimated poses q 230 and predicted features p 228 based on $p_d$ 224, the accurate human model, and its constraints. The pose reconstruction module 208 is further configured to transmit p 228 to the missing feature augmentation module 206 and the ambiguity resolve module 210 to resolve subsequent ambiguities and to estimate intermittently missing or occluded features. The estimated (or reconstructed, recovered) pose, parameterized by the vector q 230, describes the predicted motion and pose of all n degrees of freedom in the human model. The predicted features p 228 are fed-back to the missing feature augmentation module 206 to augment intermittently missing or occluded features, and to the ambiguity resolve module 210 to resolve ambiguities in case multiple feature candidates are detected.

The pose reconstruction module 208 includes a hand posture recognition module 250 configured to recognize hand postures captured in the depth image stream 108. The hand posture recognition module 250 identifies hand regions in the depth image stream 108 based on $p_d$ 224 and segments the hand regions from the depth image stream 108. The hand posture recognition module 250 describes hand postures of the segmented hand regions by calculating Inner Distance Shape Context (IDSC) descriptors (also called IDSC signatures), and recognizes the hand postures by classifying the IDSC descriptors. An example architecture and operation of the hand posture recognition module 250 is described in detail below with respect to FIGS. 4, 5A, and 5B.

The ambiguity resolve module 210 is configured to resolve ambiguities when the feature detection module 202 detects multiple possible feature candidates. The ambiguity resolve module 210 receives the predicted features p 228 from the pose reconstruction module 208 through a feedback path 250 and utilizes p 228 to resolve the ambiguities. For example, p 228 may indicate that the hypothesized location of one candidate for a feature (i.e., from the feature detection module 202) is highly improbable, causing the ambiguity resolve module 210 to select another candidate of the feature as the detected feature. As another example, the ambiguity resolve module 210 may choose the feature candidate that is closest to the corresponding predicted feature to be the detected feature. Alternatively or additionally, the ambiguity resolve module 210 may use the predicted feature as the detected feature.

The pose estimation system 100, or any of its components described above, may be configured as software (e.g., modules that comprise instructions executable by a processor), hardware (e.g., an application specific integrated circuit), or a combination thereof. The software and/or hardware may operate in a computer system that is structured to include a processor, memory, computer-readable storage medium (e.g., hard drive), network interfaces, and applicable operating system and other functional software (e.g., network drivers, communication protocols). Those of skill in the art will recognize that other embodiments can have different and/or additional modules than those shown in FIG. 2. Likewise, the functionalities can be distributed among the modules in a manner different than described herein. Further, some of the functions can be provided by entities other than the pose estimation system 100.

Overview of Methodology for Estimating Pose

Figure 3:
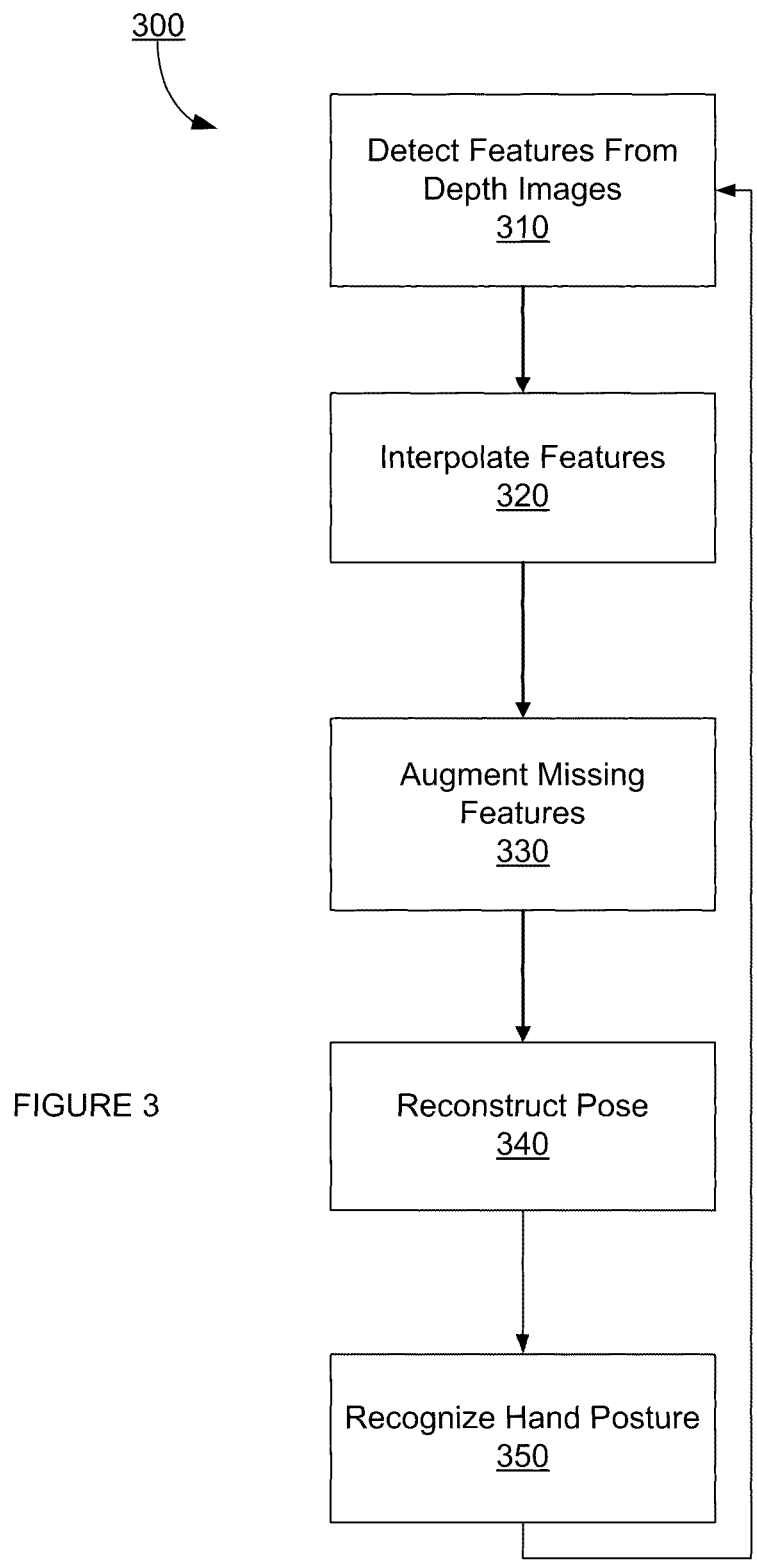
FIG. 3 is a flow diagram illustrating a hand posture recognition and body pose estimation process in accordance with one embodiment of the invention.

FIG. 3 is a flowchart illustrating an example process 300 of the pose estimation system 100 for estimating human body pose and recognizing hand posture in accordance with one embodiment of the invention.

The feature detection module 202 detects 310 body features of the human actor in the depth image stream 108. In one embodiment, the feature detection module 202 detects body features by detecting corresponding key points in the contour using IDSC descriptors. Further information of IDSC based feature detection is found in U.S. application Ser. No. 12/709, 221, filed concurrently with this application, titled "Body Feature Detection and Human Pose Estimation Using Inner Distance Shape Contexts", the content of which is incorporated by reference herein in its entirety. In another embodiment, the feature detection module 202 detects 310 the features by first detecting a head, neck, and trunk (H-N-T) deformable template and limbs, and then localizing the features based on the detected H-N-T template and limbs. Further information of H-N-T template based feature detection is found in U.S. application Ser. No. 12/317,369, filed Dec. 19, 2008, titled "Controlled Human Pose Estimation From Depth Image Streams" and U.S. application Ser. No. 12/455,257, filed May 29, 2009, titled "Controlled Human Pose Estimation From Depth Image Streams", both of which are incorporated by reference herein in its entirety. When multiple feature candidates are detected, the feature detection module 202 utilizes the previously generated predicted features p to resolve ambiguities.

The interpolation module 204 interpolates 320 the detected features $p_{det}$ to re-sample the data to a higher rate (e.g., 100 Hz). In one embodiment, the interpolation module 204 interpolates 320 the detected features using a local cubic spline interpolation routine. The interpolation is performed to ensure stability of numerical integrations performed in the pose reconstruction module 208. In one embodiment, the interpolation module 204 low-pass filters the detected features $p_{det}$ before interpolating the filtered features.

The missing feature augmentation module 206 augments 330 the interpolated features $\bar{p}_{det}$ with positions of undetected features and generates augmented feature vector $p_a$. As noted above, the feature detection module 202 may detect less than fourteen body features at each frame due to occlusions or unreliable observations. The missing feature augmentation module 206 estimates those undetected features using previously generated predicted features p. If m<k, the detected features are augmented with (k−m) predicted features p obtained from forward kinematics computations of the reconstructed pose.

The pose reconstruction module 208 reconstructs 340 the observed body pose q of the human actor in a human model and predicts subsequent features (or feature point positions) p. The predicted position of each feature is described by the vector $p_i$ and referenced to a base frame corresponding to a waist joint coordinate system. In one embodiment, the pose reconstruction module 208 reconstructs 340 human pose by tracking the observed features and prioritizing features according to their importance or level of confidence. The pose reconstruction module 208 predicts subsequent features by enforcing kinematic constraints of the human model, such as joint limitations and self penetration avoidance.

The hand posture recognition module 250 recognizes 350 hand postures of the human actor captured in the depth image stream 108. Hand regions are identified in the depth image stream 108 based on detected features, and segmented based on skin color of the human actor. IDSC descriptors are calculated for the segmented hand regions and fed to a Support Vector Machine (SVM) trained to classify the IDSC descriptors into a hand posture class. The hand postures are recognized based on the classifications of the IDSC descriptors.

One or more portions of the method 300 may be implemented in embodiments of hardware and/or software or combinations thereof. For example, the method 300 may be embodied through instructions for performing the actions described herein and such instrumentations can be stored within a tangible computer readable medium (e.g., flash memory, RAM, nonvolatile magnetic storage device) and are executable by a computer processor. Furthermore, those of skill in the art will recognize that other embodiments can perform the steps of the method 300 in different order. Moreover, other embodiments can include different and/or additional steps than the ones described here. The pose estimation system 100 can perform multiple steps or multiple instances of the process 300 concurrently and/or in parallel.

Overview of Architecture for Hand Posture Recognition Module

Figure 4:
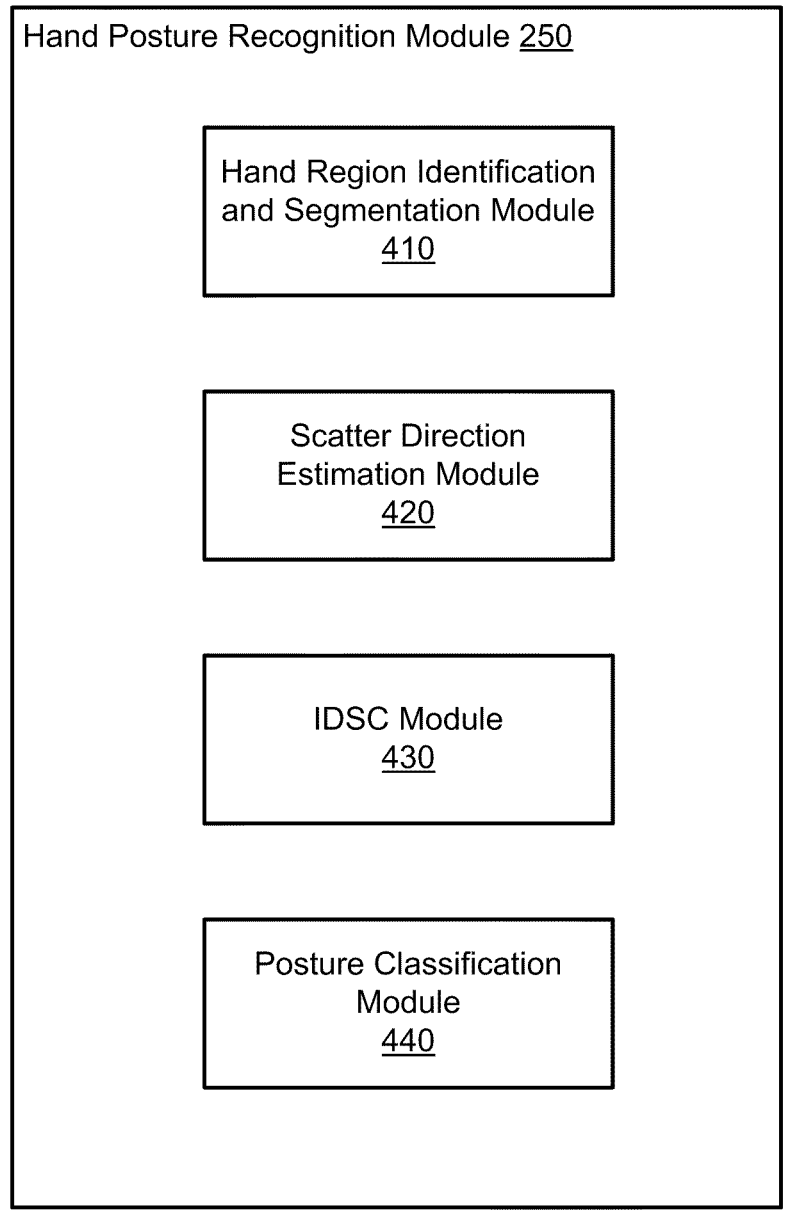
FIG. 4 is a block diagram illustrating a configuration of a hand posture recognition module shown in FIG. 2 in accordance with one embodiment of the invention.

FIG. 4 is a high-level block diagram illustrating a detailed view of modules within the hand posture recognition module 250 according to one embodiment. Some embodiments of the hand posture recognition module 250 have different and/or other modules than the ones described herein. Similar to the pose estimation system 100, modules of the hand posture recognition module 250 may be configured as software and/or hardware, and the functions can be distributed among the modules in accordance with other embodiments in a different manner than is described here. As illustrated, the hand posture recognition module 250 includes a hand region identification and segmentation module (also call the segmentation module) 410, a scatter direction estimation module 420, an IDSC module 430, and a posture classification module 440.

Hand Region Identification and Segmentation

The segmentation module 410 is configured to identify hand regions in a body figure detected in an image (e.g., a depth image in the image stream 108), and separate the hand regions from the rest of the body figure. In one embodiment, the segmentation module 410 identifies hand regions based on the locations of the left and right wrists detected in the image, and segments the hand regions from the rest of the body figure based on skin color. In one embodiment, the human actor in the images wears a long sleeve shirt. Thus, the skin color can be used as the cue to separate the hand regions from the rest of the body figure.

The segmentation module 410 builds Gaussian models of skin regions corresponding to a hand and non-skin regions near the identified hand location, and measures how the pixels in the image correlate with the models. In one embodiment, the segmentation module 410 uses the normalized red-green-blue color space in this process. The segmentation module 410 creates Gaussian mixture models based on the normalized red and green components of the image pixels. For instance, each pixel was represented by the following vector $$Y = \begin{bmatrix} R/(R+G+B) \\ G/(R+G+B) \end{bmatrix}, \quad (1)$$

where R, G, and B are the red, green and blue components of that pixel. Pixels $Y_i$ corresponding to similar regions (skin or non-skin) are grouped together from the image as $$X(i)=[Y_1 Y_2 \ldots Y_N], \quad (2)$$

where i={1, 2} (1 for skin and 2 for non-skin), and N represents the number of pixels. The mean value and covariance of the N pixels are computed to build the Gaussian models, $$N(\mu_1, \Sigma_1) \rightarrow \text{skin}$$

$$N(\mu_2, \Sigma_2) \rightarrow \text{non-skin} \quad (3)$$

The pixels are then classified as belonging to the skin class or to the non-skin class, depending on their strength of affinity to the two Gaussian models. The segmentation module 410 casts this classification problem into a maximum-a-posteriori (MAP) framework, and expresses the posterior probability as the following function of likelihood and prior probability $$p(\theta \mid X) = \frac{p(X \mid \theta) p(\theta)}{p(X)}, \quad (4)$$

where $p(\theta|X)$ is the posterior distribution (i.e. probability that a given pixel will belong to the class θ (here, skin or non-skin)), $p(X|\theta)$ is the likelihood function (measure of affinity of a pixel for the class θ) and $p(\theta)$ is the prior probability (normal occurrence rate of a particular class). So, for a two-class problem, a pixel X is said to belong to class 1 if, $$p(\theta_1|X) > p(\theta_2|X) \quad (5)$$

$$p(X|\theta_1)p(\theta_1) > p(X|\theta_2)p(\theta_2) \quad (6)$$

$$p(X|\theta_1) > p(X|\theta_2) \quad (7)$$

Equations 5-7 are equivalent for a two-class problem when equal priors are assumed. The likelihood function which is used for decision making, is computed as follows, $$P(X \mid \theta_{skin}) = \frac{1}{|\Sigma_1|^{1/2}(2\pi)^{n/2}} e^{-\frac{1}{2}(X-\mu_1)^T \Sigma_1^{-1}(X-\mu_1)}, \quad (8)$$

$$P(X \mid \theta_{non\text{-}skin}) = \frac{1}{|\Sigma_2|^{1/2}(2\pi)^{n/2}} e^{-\frac{1}{2}(X-\mu_2)^T \Sigma_2^{-1}(X-\mu_2)}. \quad (9)$$

Thus, if $p(X|\theta_{skin}) > p(X|\theta_{non\text{-}skin})$, the pixel is classified as skin region, or otherwise. This process is done for every pixel in the image to obtain the skin segmentation output. The segmentation module 410 can subject the segmented result to morphological operations such as dilation to fill-in the pixels that could possibly be mislabeled. Dilation is similar to low pass filtering that smoothes the segmented results to maintain regional homogeneity. In one embodiment, to prevent connecting two separate fingers while applying the morphological operations, the segmentation module 410 uses a 3×3 low-pass filter to achieve this objective. The segmentation module 410 crops the resultant skin/non-skin map to yield the hand region.

Scatter Direction Estimation

The scatter direction estimation module 420 is configured to estimate a primary scatter direction for each of the segmented hand regions. The primary scatter direction (also called scatter direction) describes a primary orientation direction of the hand. The hand regions can be grouped according to their scatter directions, such that hand shapes with similar orientation directions are in the same group and processed similarly (e.g., fed to a same SVM).

In one embodiment, the scatter direction estimation module 420 estimates the primary orientation direction using principal component analysis (PCA), which projects the hand region along the direction of maximum scatter. Further information of PCA is found in M. Turk and A. Pentland, "Face recognition using eigenfaces", *Computer Vision and Pattern Recognition (CVPR 91)*, 586-591 (1991), the content of which is incorporated by reference herein in its entirety. The scatter direction estimation module 420 applies the PCA algorithm to compute the eigenvectors from the covariance matrix of the segmented hand regions. The eigenvectors (corresponding to large eigenvalues) represent the directions of maximum scatter of the hand regions. Thus, the scatter direction estimation module 420 can estimate the scatter direction of a hand region based on the co-ordinates of the eigenvector that has the maximum eigenvalue, as summarized by the following representative equations.

Consider a set of N sample points of the segmented hand region $\{X_1, X_2, \ldots, X_N\}$, whose values are their corresponding 2D locations. The scatter direction estimation module 420 uses PCA to estimate the direction of maximum scatter by computing a linear transformation $W^T$. The scatter direction estimation module 420 computes $W^T$ by computing the total scatter matrix defined as $$S_T = \sum_{k=1}^{N} (X_k - \mu)(X_k - \mu)^T, \quad (10)$$

where N represents the number of sample points, and $\mu$ is the mean location of all the samples. The projection matrix $W_{opt}$ is chosen such as to maximize the determinant of the total scatter matrix of the projected samples, that is, $$W_{opt} = \arg\max |W^T S_T W| = [W_1 W_2], \quad (11)$$

where $W_1$ and $W_2$ are the set of 2 dimensional eigenvectors. In this case, the eigenvector $W_{eig}$ corresponding to the maximum eigenvalue gives the direction of maximum scatter. The estimate of the scatter direction is then computed by the following function $$\tan^{-1} \frac{W_{eig}(Y)}{W_{eig}(X)}. \quad (12)$$

IDSC Descriptor Calculation

The IDSC module 430 is configured to characterize a segmented hand region by calculating an Inner Distance Shape Context (IDSC) descriptor for the region. Shape context is a descriptor used to measure similarity and point correspondences between shapes. See S. Belongie, J. Malik, and J. Puzicha, "Shape Matching and Object Recognition Using Shape Contexts", *IEEE Trans. Pattern Analysis and Machine Intel.* (*PAMI*), 509-522 (2002), the content of which is incorporated by reference herein in its entirety. The shape context of an object describes each point along the object's contour with respect to all other points in the contour. Suppose there are n points on the contour of a shape. The shape context of a point $p_i$ is the coarse histogram $h_i$ of the relative coordinates of the remaining n−1 points as defined in the following equation:

$$h_i(k) = \#\{q \neq p_i : (q - p_i) \in \text{bin}(k)\}, \quad (13)$$

where k represents the index of the histogram bin. The histogram is computed based on both distance and angle for each point on the contour, with respect to all other points on the contour. The bins are normally taken to be uniform in log-polar space.

IDSC is an extension of the original shape context. See H. Ling and D. W. Jacobs, "Shape Classification Using the Inner-Distance", *IEEE Trans. Pattern Analysis and Machine Intel.* (*PAMI*), 286-299 (2007), the content of which is incorporated by reference herein in its entirety. Similar to the shape context, the IDSC is a histogram of the contour points in the log-polar space that describes how each point is related to all other contour points in terms of distance and angle. The IDSC primarily differs from the shape context in the way the distance and angle between the contour points are computed. The shape context descriptor uses a normal Euclidean distance measure, whereas the IDSC descriptor computes an inner distance between the points along a shortest path that travels within the object's contour. The angular relation in IDSC was also measured interior to the object's contour, termed as the inner angle. The inner angle is defined as the angle between the contour tangent at the start point and the direction of the inner distance originating from it. The IDSC descriptor is computed by applying the inner distance and the inner angle to Equation 13.

The IDSC module 430 samples points along the contour of a segmented hand region, and calculates (or determines) an IDSC descriptor for the hand region by applying Equation 13 to the inner distances and the inner angles of each of the sampled contour point. In one embodiment, the contour points are selected evenly along the boundary of the hand shape. The resulting IDSC descriptor captures the distribution of each sampled contour point relative to all other sampled contour points and thereby is a rich description of the shape of the segmented hand region.

Hand Posture Classification

The posture classification module 440 is configured to recognize the hand posture observed in a hand region by classifying the IDSC descriptor of the hand region using a Support Vector Machine (also called SVM, SVM classifier). Further information SVM is found in C. J. C. Burges, "A Tutorial on Support Vector Machines for Pattern Recognition", *Data Mining and Knowledge Discovery*, 2(2):121-167 (1998), the content of which is incorporated by reference herein in its entirety. The posture classification module 440 first trains the SVM classifier by feeding it with the IDSC descriptors of training hand images along with labels identifying the hand states of the corresponding training hand images (e.g., "open", "closed"). The SVM classifier attempts to find a linear separating hyperplane that separates the IDSC descriptors. If $x_i$ are the training instances, and $y_i$ are their corresponding labels, the SVM classifier tries to find an optimal separating hyperplane that satisfies the following equation:

$$y_i(x_i \cdot w + b) \geq 0 \quad (14)$$

for all i, where w is the normal to the hyperplane and $|b|/\|w\|$ is the perpendicular distance of the hyperplane from $x_i$.

In practice, the IDSC descriptors may not be linearly separable. The assumption here is, such IDSC descriptors that are linearly non-separable in their original dimension, can become well separated in a higher dimensional space. So, the SVM classifier projects the data into a higher dimensional space to find the best linear separating hyperplane that classifies the IDSC descriptors with very few errors. In this process, the algorithm identifies the training samples that are crucial in separating the two classes as the "support vectors" and bases the further classification on these vectors.

After the SVM classifier is trained, the posture classification module 440 recognizes hand postures in testing images (or videos) by feeding their IDSC descriptors to the trained SVM classifier for classification. In one embodiment, a SVM classifier is trained for each group of hand regions (also called orientation bins) with similar scatter directions. The posture classification module 440 recognizes hand shape captured in a hand region by projecting the corresponding IDSC descriptor onto the appropriate SVM classifier (i.e., the classifier associated with the orientation bin the testing image belongs) for hand shape classification.

Overview of Methodology for Recognizing Hand Posture

Figure 5A:
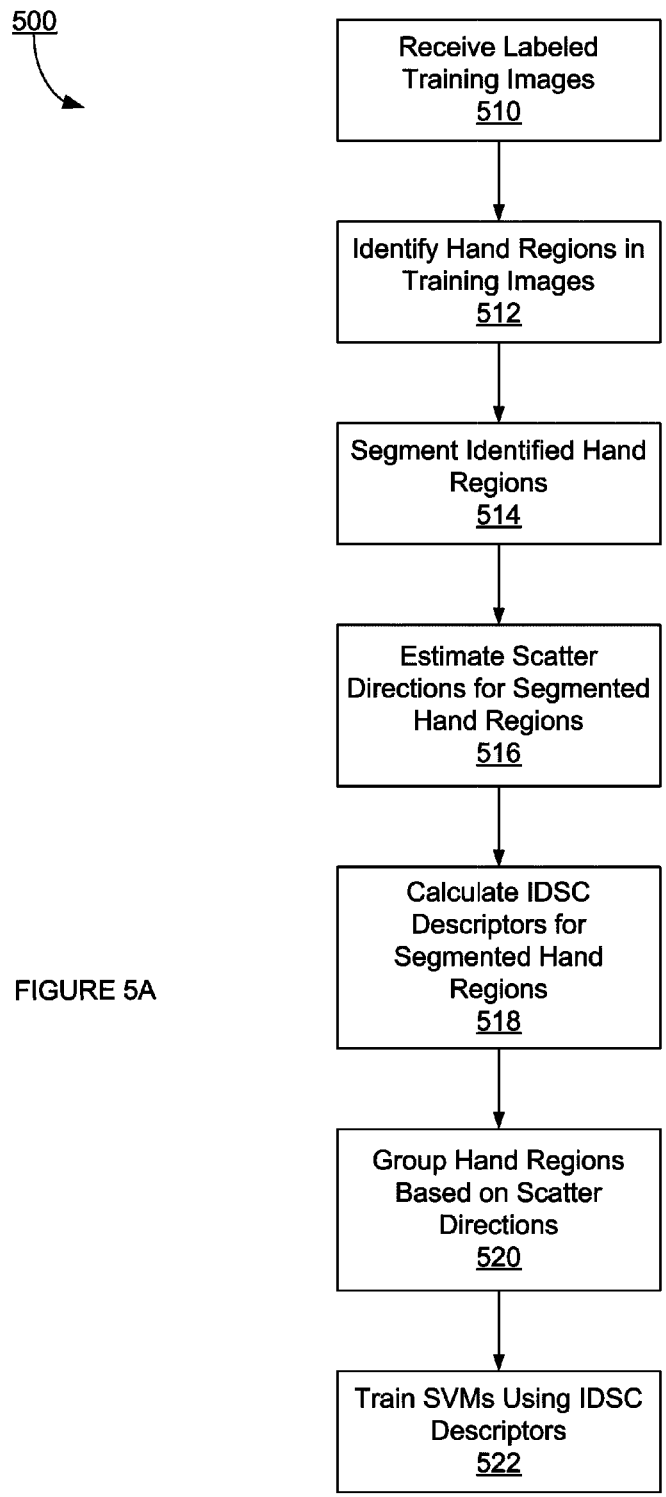
FIGS. 5A-B are flow diagrams collectively illustrating a hand posture recognition process in accordance with one embodiment of the invention.
Figure 5B:
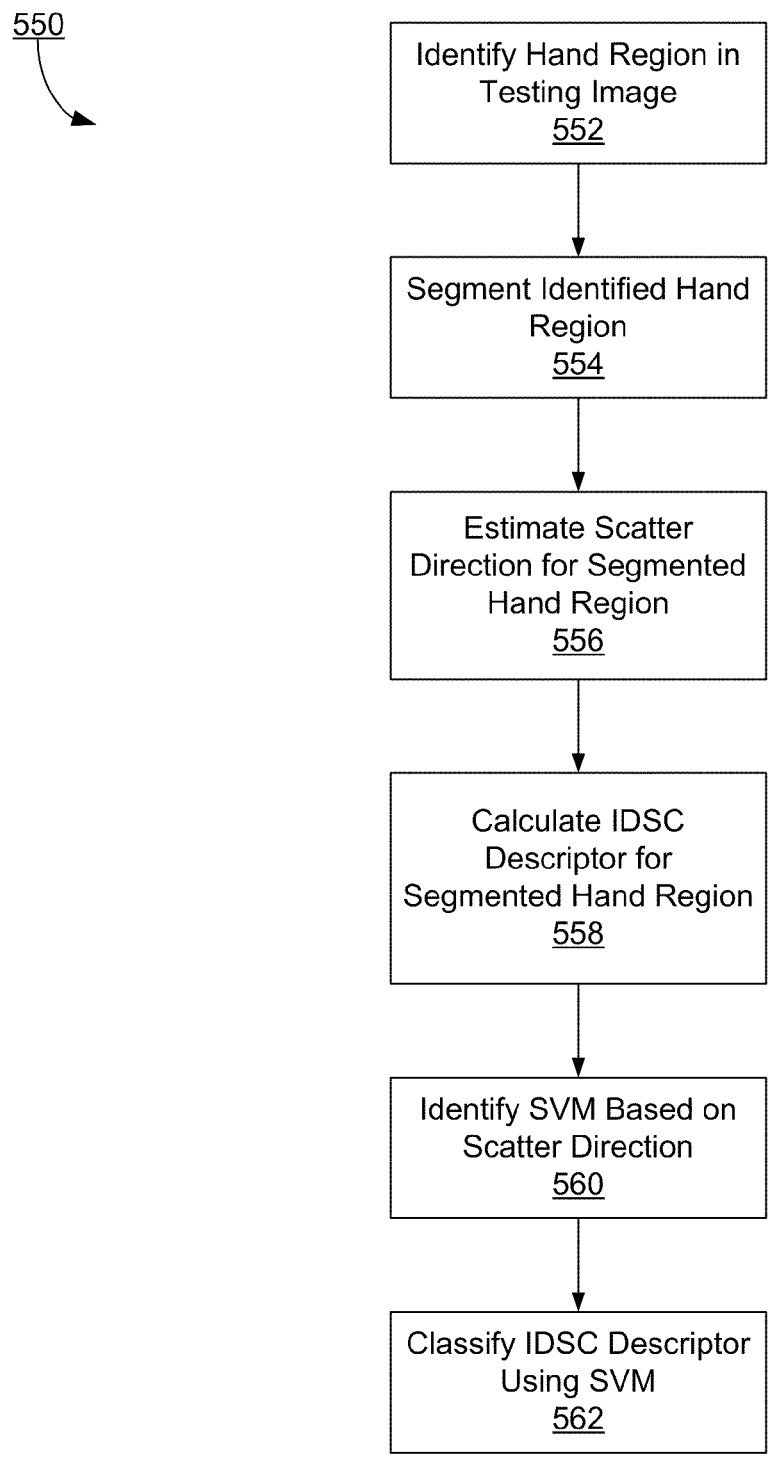

FIGS. 5A and 5B are flowcharts that collectively illustrate an example process for the hand posture recognition module 250 to recognize hand postures according to one embodiment. Similar to the process 300, the hand posture recognition process may be implemented in embodiments of hardware and/or software or combinations thereof. Other embodiments can perform the steps of the hand posture recognition process in different order. The hand posture recognition module 250 can perform multiple steps or multiple instances of the process concurrently and/or in parallel.

Referring now to FIG. 5A, a flowchart that illustrates an example process 500 for the hand posture recognition module 250 to train a set of SVM classifiers to classify hand shape IDSC descriptors according to their corresponding hand states in accordance with one embodiment of the invention. As shown, the hand posture recognition module 250 receives 510 a set of training images associated with labels indicating hand postures captured thereon (e.g., "open", "closed"). Examples of the training images are depth images in a recorded depth image stream.

The hand posture recognition module 250 identifies 512 hand regions in the training images. In one embodiment, the training images are first processed by the pose estimation system 100 to detect body features. The hand posture recognition module 250 identifies 512 the hand regions based on the location of the features detected in the training images. For example, the hand posture recognition module 250 identifies the hand regions in a training image as the image regions around visible end points near the detected left and right wrists.

The hand posture recognition module 250 segments 514 the identified hand regions from the rest of the training images using skin color, and estimates 516 the scatter directions of the segmented hand regions using the PCA algorithm. The hand posture recognition module 250 calculates 518 IDSC descriptors for the segmented hand regions by sampling points along the contour of the hand regions, applying Equation 13 to the inner distances and the inner angles of each of the sampled contour points.

The hand posture recognition module 250 groups 520 the segmented hand regions (or their IDSC descriptors) into different orientation bins based on their scatter directions, and trains 522 a Support Vector Machine (SVM) classifier for each of the orientation bins by feeding the SVM classifier with the IDSC descriptors in that orientation bin and the associated hand state labels indicating the corresponding hand states.

Referring now to FIG. 5B, a flowchart that illustrates an example process 550 for the hand posture recognition module 250 to recognize hand posture captured in a testing image in accordance with one embodiment of the invention. The process 550 initiates once the process 500 ends, that is, once the SVM classifiers are trained. As shown, similar to the process 500, the hand posture recognition module 250 identifies 552 a hand region in the testing image, segments 554 the hand region from the testing image, estimates 556 a scatter direction for the segmented hand region, and calculates 558 an IDSC descriptor for the segmented hand region.

The hand posture recognition module 250 identifies 560 a SVM classifier associated with the orientation bin the segmented hand region belongs based on its scatter direction, and classifies 562 the IDSC descriptor by feeding it into the identified SVM classifier for classification. The hand posture recognition module 250 recognizes the hand shape associated with the classification result as the hand posture captured in the testing image.

EXAMPLES

One embodiment of the disclosed framework is tested to recognize several sets of hand shapes. A single camera is used in the test to capture the hand postures of a human performer. Segmented hand regions (or corresponding IDSC descriptors) are grouped into 10 orientation bins according to their scatter directions (i.e., [0°, 18° into bin 1, [18°, 36° into bin 2, . . . , [168°, 180° into bin 10).

The first posture group tested includes two hand shapes: open and closed hand shapes. The SVM classifiers are trained using the IDSC descriptions of open/closed hand shapes, about 50 examples per state. Once the SVM classifiers are trained, the pose estimation system 100 is tested with eight different videos of different human actors performing different routines with open/closed hands. The videos contain very high in-plane hand rotations (up to +/−180° and substantial out-of-plane hand rotation (up to +/−) 45°. The videos were sampled on the frame rate, and the resulting images were segmented using skin color to obtain the hand regions. The IDSC descriptor was then obtained for the segmented hand region and projected onto the trained SVM classifiers (corresponding to its primary orientation direction category) for classification.

Figure 7A:
FIGS. 7A-C are diagrams showing images used to train and test the pose estimation system shown in FIG. 1 in accordance with one embodiment of the invention.

FIG. 7A shows images of hand postures used to train and test the pose estimation system 100. The top row includes some of the training images of the closed hand state. The middle row includes some of the training images of the open hand state. The bottom row includes some of the testing images. The pose estimation system 100 accurately recognizes closed hand states captured in the eight datasets 85% of the times, and open hand states 93% of the times.

Two more posture groups are tested to assess the generalizability of the platform in recognizing more complex hand shape patterns. In particular, the platform is applied for recognizing hand postures used in grasping as well as hand sign language. Since such applications involve solving the N-class pattern matching problem (where N is the total number of classes), N SVM classifiers were used in one-against-all configuration. The leave-one-out strategy was used for classification. Otherwise, similar training and testing procedures were followed.

For grasp recognition, the platform is applied to recognize a subset of the taxonomy of grasps proposed by Cutkosky et. al. in "On grasp choice, grasp models, and the design of hands for manufacturing tasks", *Robotics and Automation, IEEE Transactions*, 5(3):269-279 (1989), the content of which is incorporated by reference herein in its entirety. In particular, the platform is trained to recognize the following four grasp patterns: small diameter grasp, four-finger-thumb grasp, precision disc grasp, and platform grasp. Videos of three different people demonstrating each of the four grasp categories in different viewing poses are recorded by a camera. The poses contained substantial in-plane rotations. The pose estimation system 100 achieves 84% recognition rate on average.

For sign language pattern matching, the platform is applied to recognize eight sign languages adopted from K. Fujimura and X. Liu, "Sign recognition using depth image streams", *Proceedings of the* 7th International Conference on Automatic Face and Gesture Recognition, 381-386 (2006), the content of which is incorporated by reference herein in its entirety. The pose estimation system 100 achieves 80% classification accuracy on average.

Figure 7B:
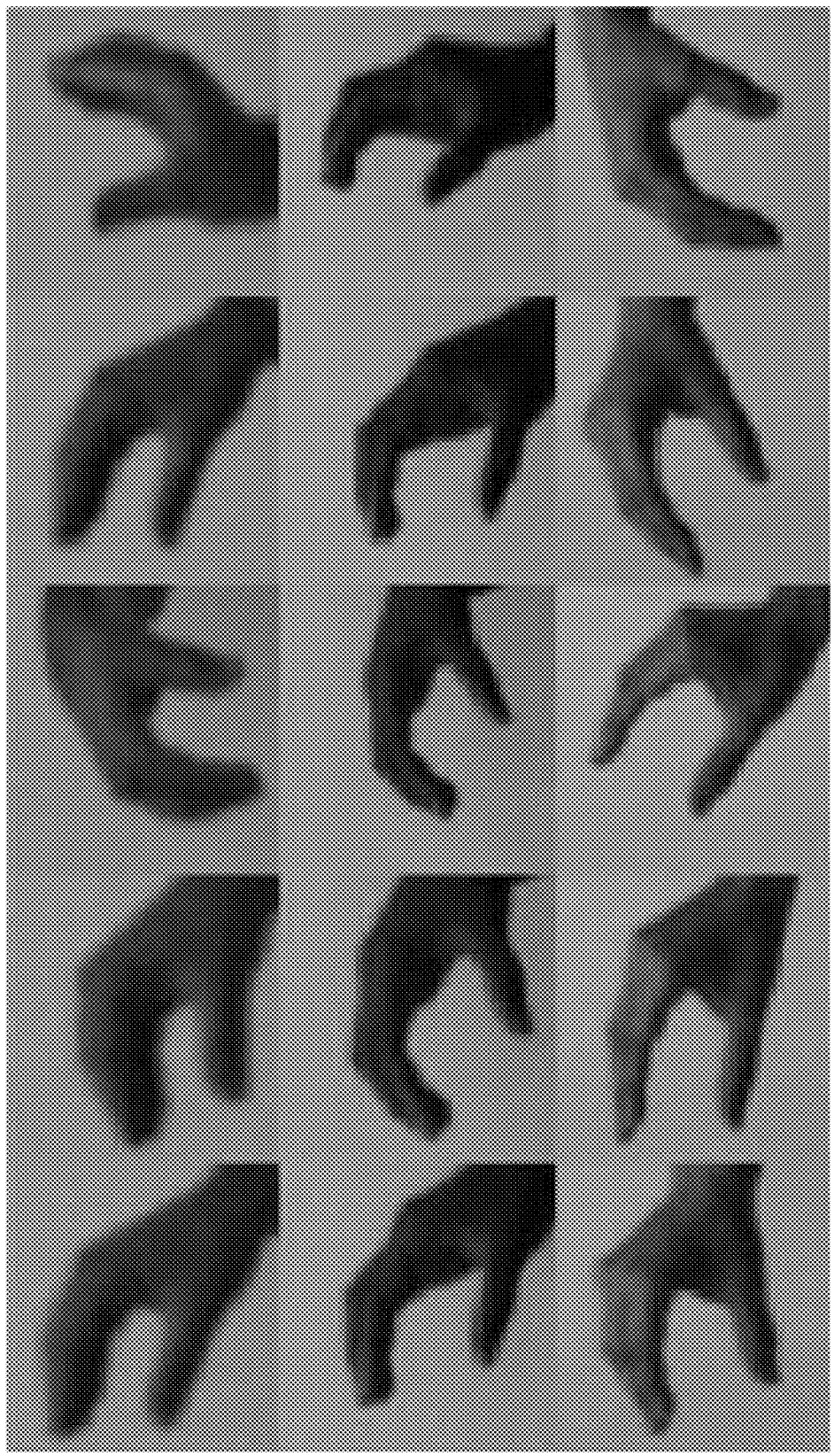
Figure 7C:
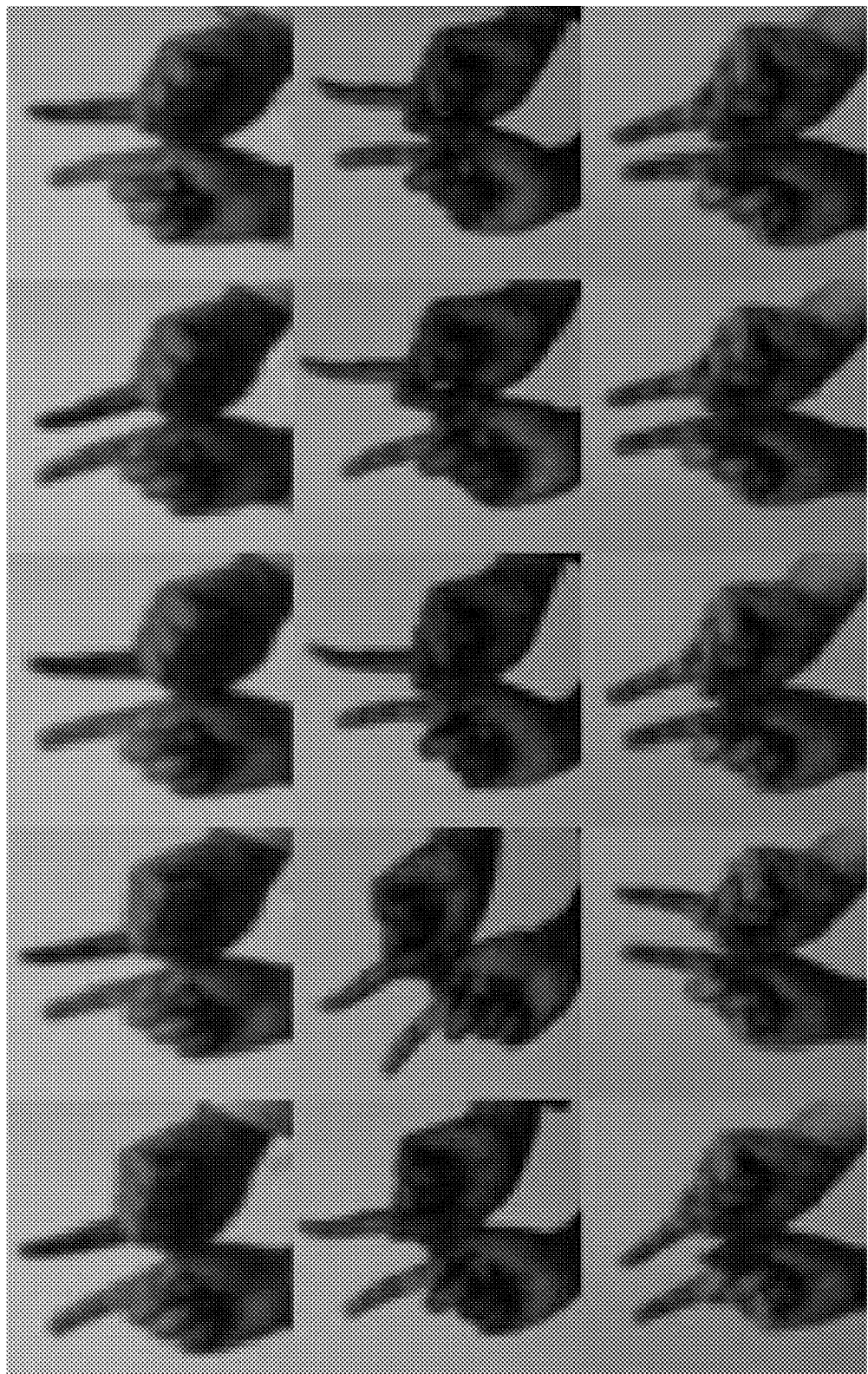

FIGS. 7B and 7C show additional images of grasp patterns and sign languages used to train and test the pose estimation system 100, respectively. The top and middle rows include some of the training images of a particular pattern, and the bottom row includes some of the corresponding testing images.

As shown in FIGS. 7A-C, the training images and testing images are not always similar. The subjects were free to rotate their hands during the collection of both training and testing images. These results are very encouraging since it confirms that the platform is very effective for general hand state recognition in real world settings, invariant to viewpoints, and not person dependent.

For further detail of the experiments, please refer to U.S. Provisional Application No. 61/155,439, filed Feb. 25, 2009, the content of which is incorporated by reference herein in its entirety.

Additional Embodiments

The above embodiments describe a pose estimation system for recognizing hand postures of a human actor in real time. One skilled in the art would understand that the pose estimation system can be used for recognizing postures of other body segments of human beings or other motion generators such as animals. In addition, the pose estimation system can be configured to provide additional functions such as motion retargeting, robotic motion generation and control, and joint torque estimation in biomechanics. For example, the output of the pose estimation system can be effectively used to transfer hand motion to a robotic hand in real time, and thus can readily be applied to applications such as tele-robotic grasping.

Some portions of above description describe the embodiments in terms of algorithmic processes or operations, for example, the processes and operations as described with FIGS. 3 and 5A-B.

One embodiment of the present invention is described above with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems. The invention can also be in a computer program product which can be executed on a computing system.

The present invention also relates to an apparatus for performing the operations herein. This apparatus may be specially constructed for the purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer based method for recognizing a hand posture captured in an image, the method comprising:
 identifying a hand region in the image;
 estimating a scatter direction of the hand region in the image;
 determining an Inner Distance Shape Context (IDSC) descriptor for the hand region identified in the image, the IDSC descriptor not based on the scatter direction;
 matching the scatter direction to one of a plurality orientation bins, the matching orientation bin corresponding to that scatter direction;
 identifying a classifier associated with the matching orientation bin, the classifier comprising a plurality of reference IDSC descriptors corresponding to a plurality of hand posture classes, the classifier generated based on training images having scatter directions that also match the orientation bin;

classifying the hand region into one of the plurality of hand posture classes by feeding the IDSC descriptor into the classifier.

2. The method of claim 1, further comprising:

determining reference IDSC descriptors for reference hand regions in training images;

labeling each of the reference hand regions to be in one of the plurality of hand posture classes; and training the classifier to classify hand regions into the plurality of hand posture classes by feeding the classifier with the reference IDSC descriptors and the corresponding hand posture classes.

3. The method of claim 2, further comprising:

segmenting hand regions from the training images and the image based on a skin color.

4. The method of claim 3, wherein segmenting the hand regions comprises:

applying a morphological operation to the segmented hand region.

5. The method of claim 2, further comprises:

estimating scatter directions of the reference hand regions in the training images;

grouping the reference hand regions in the training images into orientation bins based on associated scatter directions of the training images; and wherein training the classifier comprises training a classifier for each of the orientation bins by feeding the classifier with the IDSC descriptors of the reference hand regions in the orientation bin.

6. The method of claim 1, wherein estimating the scatter directions comprises:

applying principal component analysis (PCA) to project the hand region along a direction of maximum scatter and determining the direction of maximum scatter as the scatter direction of the hand region.

7. The method of claim 1, wherein the image comprises a depth image taken by a single time-of-flight camera.

8. The method of claim 1, wherein the classifier is configured to determine a linear separating hyperplane that separates IDSC descriptors according to the corresponding hand posture classes.

9. The method of claim 8, wherein the classifier comprises a Support Vector Machine (SVM) classifier.

10. The method of claim 1, wherein identifying the hand region in the image comprises:

identifying the hand region in the image based on body features detected in the image.

11. A computer program product for recognizing a hand posture captured in an image, the computer program product comprising a non-transitory computer-readable storage medium containing executable computer program code for performing a method comprising:

identifying a hand region in the image;

estimating a scatter direction of the hand region in the image;

determining an Inner Distance Shape Context (IDSC) descriptor for the hand region identified in the image, the IDSC descriptor not based on the scatter direction;

matching the scatter direction to one of a plurality orientation bins, the matching orientation bin corresponding to that scatter direction;

identifying a classifier associated with the matching orientation bin, the classifier comprising a plurality of reference IDSC descriptors corresponding to a plurality of hand posture classes, the classifier generated based on training images having scatter directions that also match the orientation bin;

classifying the hand region into one of the plurality of hand posture classes by feeding the IDSC descriptor into the classifier.

12. The computer program product of claim 11, wherein the method further comprises:

determining reference IDSC descriptors for reference hand regions in training images;

labeling each of the reference hand regions to be in one of the plurality of hand posture classes; and training the classifier to classify hand regions into the plurality of hand posture classes by feeding the classifier with the reference IDSC descriptors and the corresponding hand posture classes.

13. The computer program product of claim 12, wherein the method further comprises:

segmenting hand regions from the training images and the image based on a skin color.

14. The computer program product of claim 13, wherein segmenting the hand regions comprises:

applying a morphological operation to the segmented hand region.

15. The computer program product of claim 12, wherein the method further comprises:

estimating scatter directions of the reference hand regions in the training images;

grouping the reference hand regions in the training images into orientation bins based on associated scatter directions of the training images; and wherein training the classifier comprises training a classifier for each of the orientation bins by feeding the classifier with the IDSC descriptors of the reference hand regions in the orientation bin.

16. A system for recognizing a hand posture captured in an image, the system comprising:

a computer processor for executing executable computer program code; and a computer-readable storage medium containing the executable computer program code for performing a method comprising:

identifying a hand region in the image;

estimating a scatter direction of the hand region in the image;

determining an Inner Distance Shape Context (IDSC) descriptor for the hand region identified in the image, the IDSC descriptor not based on the scatter direction;

matching the scatter direction to one of a plurality orientation bins, the matching orientation bin corresponding to that scatter direction;

identifying a classifier associated with the matching orientation bin, the classifier comprising a plurality of reference IDSC descriptors corresponding to a plurality of hand posture classes, the classifier generated based on training images having scatter directions that also match the orientation bin;

classifying the hand region into one of the plurality of hand posture classes by feeding the IDSC descriptor into the classifier.

17. The system of claim 16, wherein the method further comprises:

determining reference IDSC descriptors for reference hand regions in training images;

labeling each of the reference hand regions to be in one of the plurality of hand posture classes; and training the classifier to classify hand regions into the plurality of hand posture classes by feeding the classifier with the reference IDSC descriptors and the corresponding hand posture classes.

18. The system of claim 17, wherein the method further comprises:
segmenting hand regions from the training images and the image based on a skin color.

19. The system of claim 18, wherein segmenting the hand regions comprises:
applying a morphological operation to the segmented hand region.

* * * * *